Figure 2:
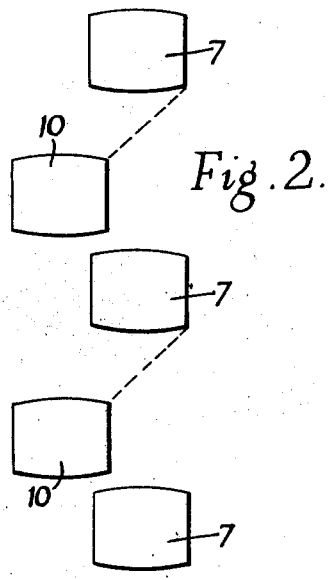

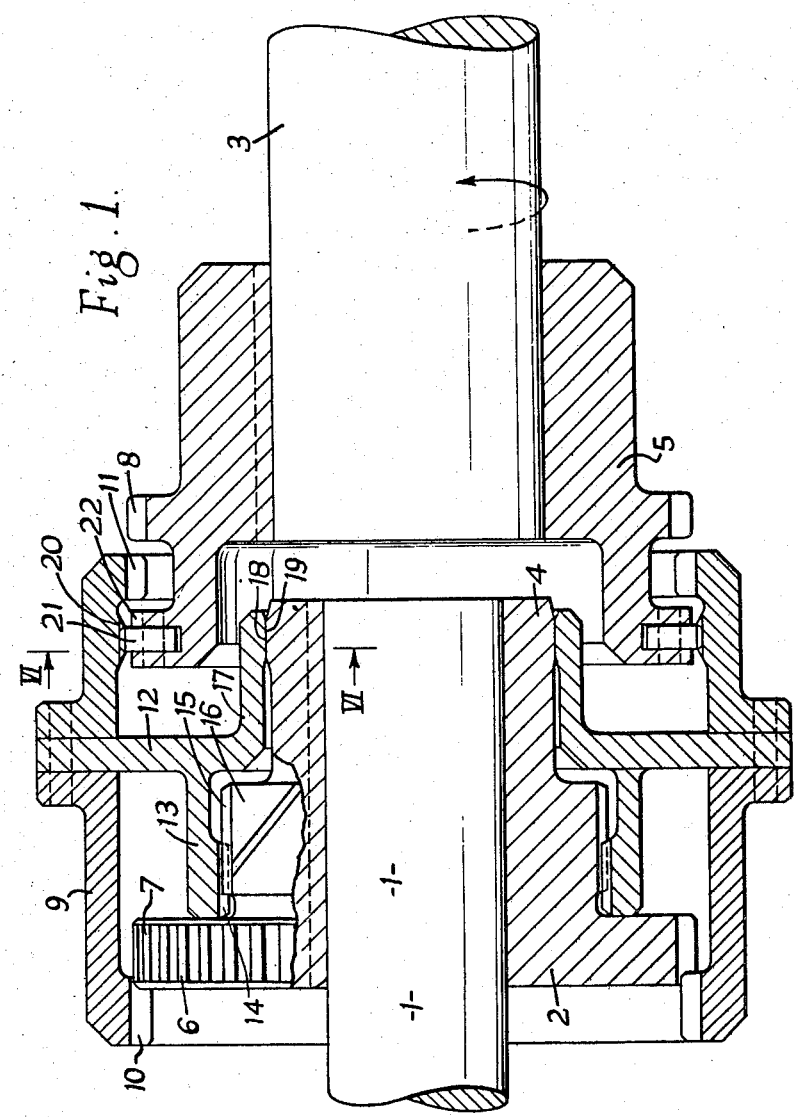

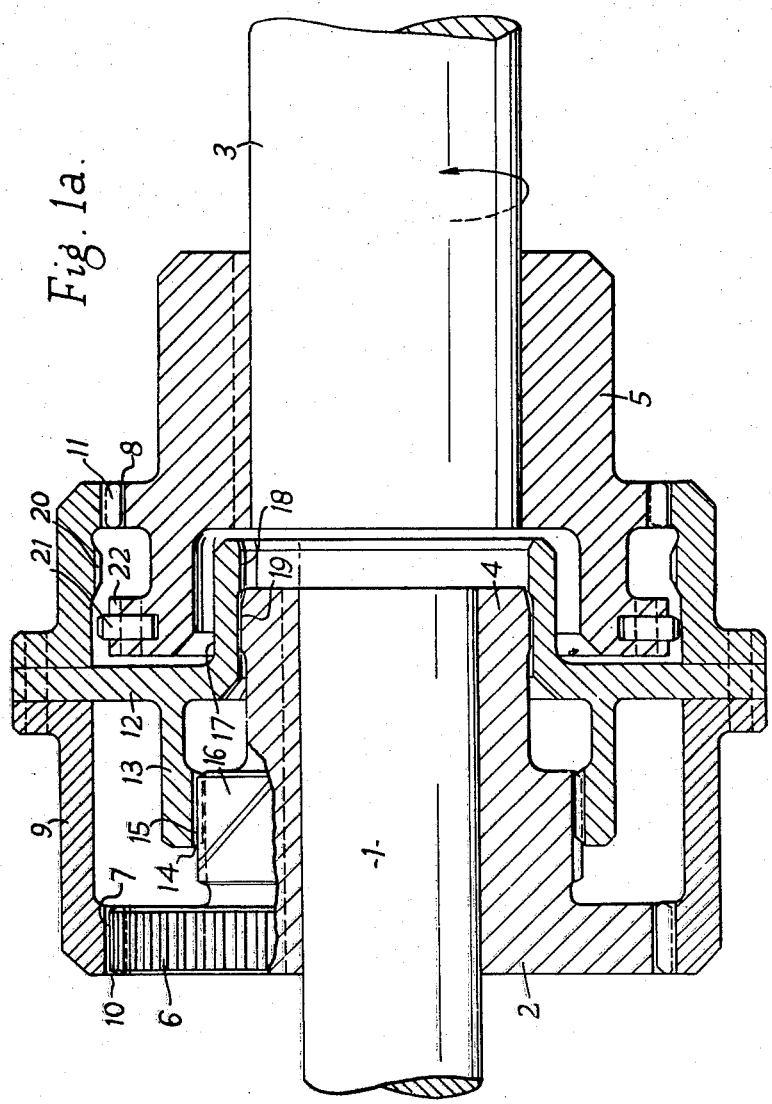

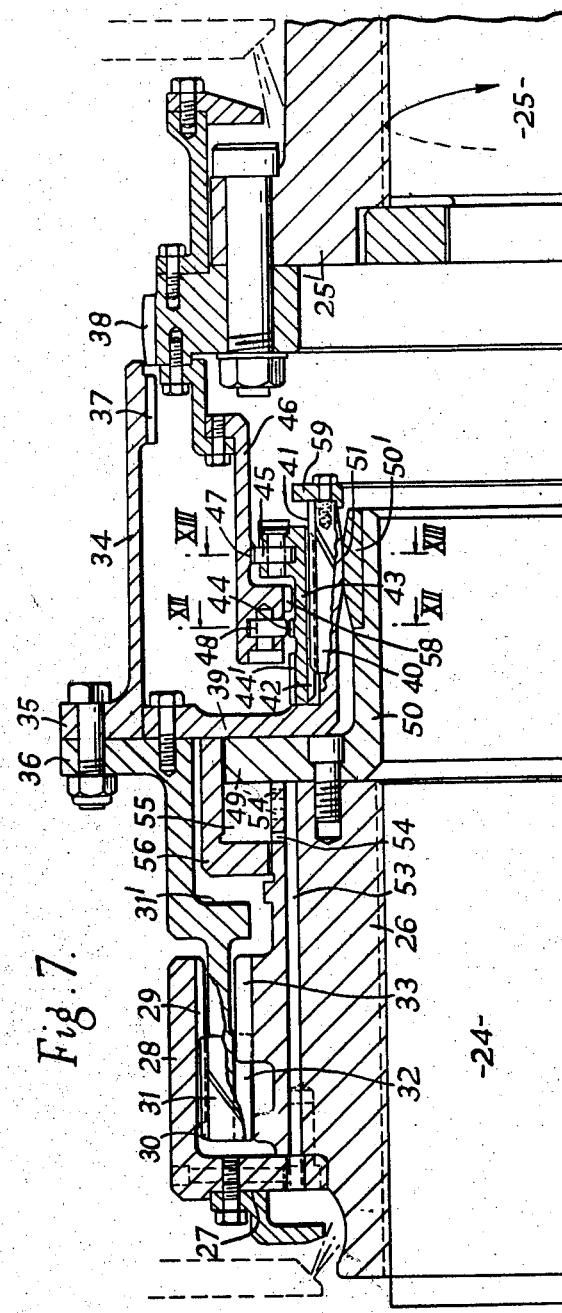

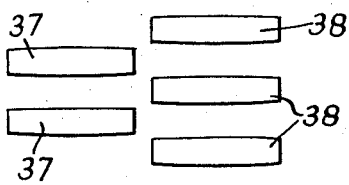
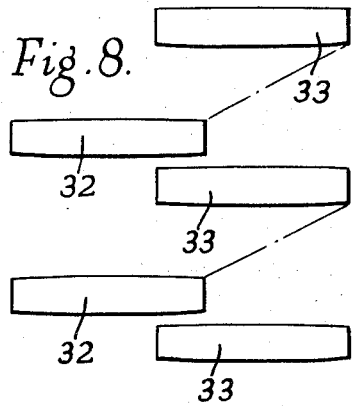
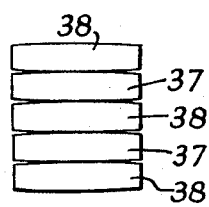
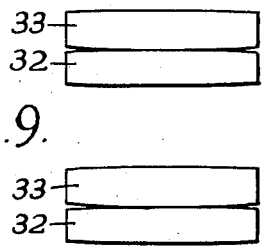
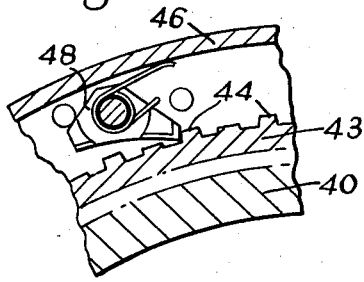
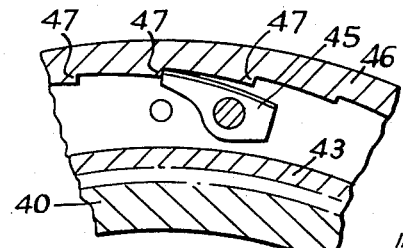

United States Patent Office 3,189,148
Patented June 15, 1965

3,189,148
SYNCHRONOUS SELF-SHIFTING CLUTCH
ARRANGEMENTS
Harold Sinclair, London, and Herbert Arthur Clements,
Weybridge, England, assignors to S.S.S. Patents Limited, Richmond, Surrey, England, a British company
Filed Mar. 6, 1962, Ser. No. 177,920
Claims priority, application Great Britain, Mar. 13, 1961,
9,181/61
3 Claims. (Cl. 192—67)

This invention relates to synchronous self-shifting clutch arrangements of the type wherein clutch engagement and disengagement are effected by the helical movement of a toothed intermediate member relative to another clutch part, with means for initiating clutch engagement upon relative movement of the said other clutch part in one direction relative to a further toothed clutch part. The object of the invention is to provide a clutch of this type which is suitable for use in association with two shafts mounted in line, for establishing or interrupting a driving connection between the shafts automatically according to the direction of relative rotation of the shafts, and which permits a slight degree of misalignment of the shafts such as is normally provided for by the use of a separate flexible coupling.

A well known form of flexible coupling is the so-called "double toothed engagement flexible coupling" in which the two shafts are provided at their facing ends with rings of teeth constituting coupling elements with which engage axially spaced rings of teeth carried by an intermediate member in the form of a sleeve or shaft, in some cases one or both rings of co-acting teeth being barrelled so that when the shafts are slightly out of alignment the co-acting sets of teeth roll on one another thereby possibly reducing wear as compared with such a flexible coupling arrangement in which the sides of all of the co-acting teeth are flat.

It is also known to use a manually operated control mechanism for moving one or other of the toothed elements of such a flexible coupling into and out of toothed engagement, for enabling the drive from one shaft to the other to be connected and disconnected at will, preferably when rotating very slowly or stationary.

In accordance with the invention the intermediate member is provided with axially spaced rings of teeth, and the two shafts are each provided with a ring of teeth which in the engaged condition of the said intermediate member co-act with the respective rings of teeth carried by the intermediate member, which member is constrained for helical movement relative to one of the shafts, to move the co-acting rings of teeth into and out of inter-engagement, the engaging movement being initiated by means, for example pawl and ratchet mechanism, on passing through synchronism in one direction of relative rotation of the said two shafts.

The helical movement of the intermediate member in the engaging direction relative to one of the shafts is limited preferably by the engagement of rings of co-acting teeth on the intermediate member and one the said shaft such as to provide a rotational stop when the two axially spaced rings of teeth on the intermediate member are in full driving engagement with the co-acting teeth of the said two shafts.

Figure 3:
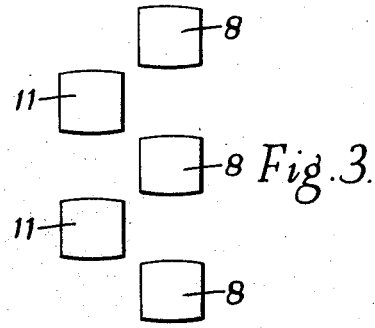
Figure 4:
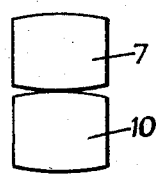
Figure 5:
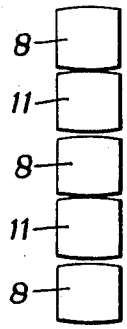
Figure 6:
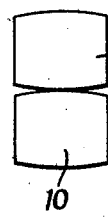
Figure 7A:
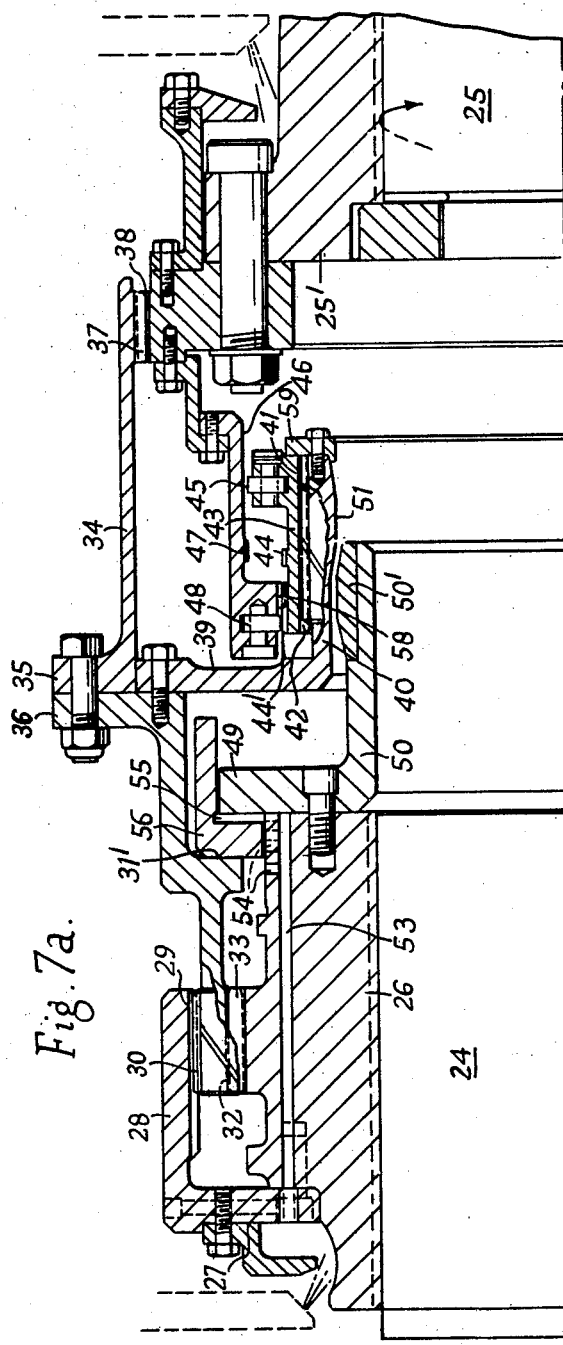

Embodiments of the invention will now be described with reference to the accompanying drawings, in which FIG. 1 is a view in longitudinal section of a clutch according to the invention, showing the clutch in the disengaged condition, FIG. 1a is a view similar to FIG. 1 showing the clutch in the engaged condition, FIG. 2 is a development view of co-acting clutch teeth of the clutch of FIG. 1 with the clutch engaged, FIG. 3 is a development view of other co-acting clutch teeth of the clutch of FIG. 1, with the clutch disengaged, FIG. 4 is a development view of the clutch teeth of FIG. 2, with the clutch engaged, FIG. 5 is a development view of the clutch teeth of FIG. 3, with the clutch engaged, FIG. 6 is a cross-sectional view on the line VI–VI of FIG. 1, FIG. 7 is a view in longitudinal section of another clutch according to the invention, particularly suitable for high powers and speeds, the clutch being shown in the engaged condition, FIG. 7a is a view similar to FIG. 7 showing the clutch in the engaged condition, FIG. 8 is a development view of co-acting clutch teeth of the clutch shown in FIG 7, with the clutch disengaged, FIG. 9 is a development view of the clutch teeth of FIG. 8, with the clutch engaged, FIG. 10 is a development view of other co-acting teeth of the clutch shown in FIG. 7, with the clutch disengaged, FIG. 11 is a development view of the clutch teeth of FIG. 10, with the clutch engaged, FIG. 12 is a cross-sectional view on the line XII–XII of FIG. 7, and FIG. 13 is a cross-sectional view on the line XIII–XIII of FIG. 7.

In FIG. 1 the first shaft 1 carries a hub 2 which is stepped so that its end facing the second shaft 3 has parts of three different diameters, the radially inner part 4 of smallest diameters projecting partly into a recess in a hub 5 carried by the second shaft 3. The part 6 of the hub 2 of largest diameter is provided with a ring of external clutch teeth 7 and the hub 5 is also formed with a ring of external clutch teeth 8. The intermediate member comprises a sleeve 9 provided at its ends with rings of internal clutch teeth 10 and 11, which are adapted to cooperate respectively with the rings of external clutch teeth 7 and 8. The sleeve 9 is made up of two parts which carry the respective rings 10 and 11 of internal clutch teeth and which are bolted together with an interposed radially inwardly projecting flanged member 12 which carries a first cylindrical part 13 formed with internal right-hand helical splines 14 which are engaged with external right-hand helical splines 15 on the part 16 of the hub 2 of intermediate diameter. The flanged member 12 also carries a second cylindrical part 17 which projects towards the shaft 3. The internal diameter of the cylindrical part 17 is reduced at its free end as shown at 18, and the part 4 of the hub 2 is of increased diameter at its free end as shown at 19, whereby there is clearance between the cylindrical part 17 and the part 4 of the hub 2 except at the free ends above-mentioned where the said parts 18 and 19 co-act to form a guide and support for the intermediate member while it is in the disengaged position.

The part of the sleeve 9 that carries the internal clutch teeth 11 is formed with a ring of internal ratchet teeth 20 with which cooperate a ring of pawls 21 mounted in an annular flange 22 on the hub 5. The thickness of the clutch teeth 8 at the pitch circle diameter is slightly less than the inter-tooth spaces of the co-acting internal clutch teeth 11, as is requisite for inter-engagement with slight working clearance. The angular arrangement of the clutch teeth 8 and 11 is otherwise normal as shown by FIG. 3. The angular arrangement of the clutch teeth 10 and 7 is as shown by FIG. 2, viz. the inter-tooth gaps are considerably wider than the tooth width. The clutch teeth 7, 8, 10 and 11 are barrelled, as shown in FIGS. 2 and 3.

The operation is as follows:

Assuming that the shaft 1 is stationary and that the shaft 3 is rotating in the direction shown by the arrow, the pawls 21 ratchet past the internal ratchet teeth 20. When the shaft 1 is accelerated in the same direction of rotation as shaft 3 and tends to over-run it the engagement of pawls 21 by ratchet teeth 20 causes the intermediate member 9 to be shifted axially towards the shaft 3, executing a movement that is helical relative to the shaft 1 and is non-rotational relative to the shaft 3 whereby the internal clutch teeth 11 engage with the adjacent external clutch teeth 8, the movement of the intermediate member 9 continuing until the clutch teeth 11 and 8 are fully inter-engaged (FIG. 5), at which point the internal clutch teeth 10 are engaged laterally by the external clutch teeth 7 (see FIG. 4) so that further axial movement of the intermediate member 9 towards the shaft 3 is prevented. There is now a unidirectional driving connection between the shafts 1 and 3. The intermediate member 9 is supported near its ends by the shafts 1 and 3, and being now unsupported by the guide member 19 is free to accomodate slight mis-alignment of the shafts.

When the shaft 1 is decelerated the interaction of the external clutch teeth 8 and the co-acting internal clutch teeth 11, and the inter-action of the helical splines 14 and 15 causes the intermediate member 9 to move back to its initial position relative to the shaft 1 in which the cylindrical part 13 of the intermediate member is up against an axial stop formed by an internal surface of the flange 6 and in which the clutch teeth 8 and 11 are disengaged and the intermediate member 9 is again supported by the guide member 19.

In an alternative arrangement the shaft 1 is connected to a driven machine, and the shaft 3 is connected to a driving motor, rotatable in the opposite direction to the arrow, in which circumstances the intermediate member 9 would be in the disengaged position when the driven machine is rotating in the direction of the arrow and the driving motor is in slower rotation or is stopped.

Upon accelerating the driving motor and when the shaft 3 passes through synchonism relative to the shaft 1 a pawl 21 will engage a ratchet tooth 20 whereupon helical movement of the intermediate member 9 will take place relative to the shaft 1 to engage the clutch as above described.

In FIG. 7 two shafts 24 and 25 are mounted in substantial alignment with their facing ends spaced axially from one another. The shaft 24 has keyed to it a hub 26 to which is bolted, on the side remote from the shaft 25, a flange 27 which extends radially with respect to the shaft axis and carries a cylindrical clutch part 28 which extends from the radial flange 27 axially towards the shaft 25, the cylindrical part 28 being radially spaced from the hub 26 so that an elongated annular cavity is formed between the hub 26 and the cylindrical part 28. The inner surface of the part 28 is formed with left hand helical splines 29 in which engage external helical splines 30 on a sleeve 31 which forms part of the intermediate member of the clutch and which is formed at the end remote from the shaft 25 with a ring of uniformly spaced elongated internal teeth 32 which extend axially, viz. parallel to the axis of the shaft 24, and the hub 26 is formed with a ring of uniformly spaced elongated external teeth 33. The disposition of the clutch teeth 32 and 33 is as shown in FIG. 8, the inter-tooth gaps being considerably wider than the tooth width.

The intermediate member also comprises a sleeve 34, a flange 35 which is bolted to a flange 36 which carries the cylindrical part 31, the sleeve 34 extending towards the shaft 25 and carrying at the end adjacent the shaft 25 a ring of internal clutch teeth 37 which extend axially with respect to the shaft 25. A hub 25' keyed to the shaft 25 carries a ring of external clutch teeth 38 which also extend axially, the arrangement of the rings of teeth 37 and 38 being such that with the cylindrical part 31 of the intermediate member fully within the cavity between the hub 26 and the cylindrical part 31 the internal clutch teeth 37 are axially spaced from the external teeth 38, as shown. The thickness measured at the pitch circle diameter of the external clutch teeth 38 is slightly less than the inter-tooth spaces of the co-acting internal clutch teeth 37 as to permit inter-engagement with the slight working clearance that is requisite.

The crowns of the clutch teeth 38 are curved as shown by FIG. 7, and the clutch teeth 37 and 38 are barrelled, viz. their long sides are curved, as shown by FIGS. 10 and 11.

The sleeve 34 carries an inwardly extending radial flange 39 which at its inner periphery carries a cylindrical part 40, the outer surface of which is formed with left hand helical splines 41 in which engage internal helical splines 42 in an auxiliary clutch sleeve 43 which has a ring of external clutch teeth 44 and carries a ring of pawls 45. The shaft 25 carries a cylindrical extension 46 which is formed with a ring of internal ratchet teeth 47 which when the auxiliary clutch sleeve 43 is in the disengaged condition as shown can co-act with the pawls 45, and is provided with a ring of pawls 48 which in the disengaged condition of the auxiliary clutch sleeve 43 can co-act with the clutch teeth 44. The extension 46 also carries a ring of internal clutch teeth 58. To the end of the hub 26 is bolted an annular flange 49 which carries a guide member 50. Over most of its axial length the outer surface of the guide member 50 is spaced radially from the internal surface of the cylindrical part 40, thereby forming a clearance space. At its free end the guide member 50 carries a ring 50' with a convex surface as shown at 51 so as to support and guide the thickened end of the cylindrical part 40 when it is in the position shown corresponding to clutch disengagement. An elongated axial oil duct 53 in the hub 26 leads via a feed orifice 54 to a dashpot chamber 55, there also being restricted orifices 54' between the duct 53 and the chamber 55. A cylindrical piston 56 encloses the dashpot chamber 55, being slidably guided by the flange 49 and the hub 26. During the engaging motion of the intermediate member 31, 34 the flange 31' moves axially into contact with the dashpot piston 56, and the final movement of the intermediate member 31, 34 is then subject to restraint, the oil in the dashpot chamber 55 being able to escape therefrom into duct 53 only via the restricted orifices 54' which are consecutively closed as the intermediate member executes its final movement.

The pawls 48 are of a centrifugally disengaging type, that is to say their noses tend to come out of ratchetting engagement with their associated ratchet teeth 44 when the shaft 25 is rotating. The pawls 45 are of a centrifugally actuated type, that is to say they are inert when the auxiliary clutch sleeve 43 is at rest, whereas rotation of the auxiliary clutch sleeve 43 urges the noses of the pawls 45 to move radially outwardly into ratchetting engagement with the ratchet teeth 47.

The operation is as follows:

Assume that the shaft 25 is rotating in the direction of the arrow, being coupled for example to an A.C. generator operating as a synchronous condenser for the purpose of power factor correction, and that the shaft 24 is stationary, being coupled for example to a shut down turbine. Under these circumstances there is no driving connection between the shafts 24 and 25 since the two rings of clutch teeth 32 and 37 carried by the intermediate member will be disengaged from the co-acting rings of clutch teeth 33 and 38 carried respectively by the hubs 26 and 25'. Both rings of pawls 45 and 48 are inactive, since the centrifugally disengaged pawls 48 are rotating with the rotating shaft 25 and the centrifugally actuated pawls 45 are inert, being carried by the stationary auxiliary clutch sleeve 43.

If now the shaft 24 is accelerated by the turbine in the same direction of rotation as the shaft 25, the centrifugally actuated pawls 45 will become effective under the action of centrifugal force so that their noses press into ratcheting relation with the internal ratchet teeth 47, which however continue to ratchet past them so long as the shaft 25 is rotating at a higher speed than the shaft 24. When the speed of the shaft 24 tends to overtake the speed of the shaft 25, an internal ratchet tooth 47 is engaged by a centrifugally actuated pawl 45 with the effect that the auxiliary clutch sleeve 43 is moved towards the shaft 25 thereby inter-engaging the external clutch teeth 44 thereon with the internal clutch teeth 58. The clutch teeth 44 are so formed as to have substantial clearance in relation to the internal clutch teeth 58, so as to accommodate slight mis-alignment between the two shafts 24 and 25. The auxiliary clutch sleeve 43 continues its movement until it comes up against an axial stop 59, in which position its clutch teeth 44 are fully engaged with the clutch teeth 58. The interaction of these clutch teeth 44 and 58 causes the auxiliary clutch sleeve 43 to exert axial pressure on its stop 59 and thereby move the intermediate member 34 towards the shaft 25, this movement being a helical movement relative to the shaft 24 due to the inter-engagement of the helical splines 29 and 30. Relative to the shaft 25 however the movement of the intermediate member 34 is non-rotational, and the geometrical relationship of the several mating clutch elements is such as to result in the precise inter-engagement of the internal clutch teeth 37 of the intermediate member 34 with the external clutch teeth 38 carried by he shaft 25. When these clutch teeth 37 and 38 are fully inter-engaged the internal clutch teeth 32 of the intermediate member 34 have moved helically into register with and are engaged laterally by the external clutch teeth 33 on the hub 26 so that the rotational stop thereby provided prevents further movement of the inermediate member 34 towards the shaft 25, whereby the shaft 24 is in positive unidirectional driving engagement with the shaft 25.

During the engaging movement of the intermediate member 34 the cylindrical part 40 moves out of supporting contact with the ring 50' on the guide member 50, so that the intermediate member 34 is now supported at its ends by the shafts 24 and 25.

When the teeth 37 and 38 are in full driving engagement the external teeth 44 on the auxiliary clutch sleeve 43 will have moved axially to the right (as seen in FIG. 7) of the internal clutch teeth 58, and teeth 44' which are formed on the sleeve 43 and which are in line with the teeth 44 will be meshed with the internal teeth 58 as is requisite to maintain the correct angular relationship between the sleeve 43 and the teeth 58 in readiness for the disengaging movement of the clutch.

When the shaft 24 is subsequently decelerated the interaction of the clutch teeth 37 and 38, and the interaction of the helical splines 29 and 30 causes the intermediate member 34 to move towards the shaft 24 until the clutch teeth 37 are disengaged from the clutch teeth 38. This axial movement of the intermediate member 34 causes the cylindrical part 40 to move into the disengaged position wherein it is again supported by the ring 50' on the guide member 50. During the disengaging movement of the intermediate member 34 the auxiliary clutch sleeve 43 is moved by the interaction of the helical splines 41 and 42 to its initial disengaged position in which the centrifugally actuated pawls 45 are in ratchetting engagement with the ratchet teeth 47. This ratchetting continues until the driving turbine is stopped and the pawls 45 become inert.

If with the shaft 24 stationary the shaft 25 is stationary or is rotating only slowly, the centrifugally disengageable pawls 48 will be in ratchetting relationship with the clutch teeth 44, so that when the shaft 24 is accelerated the pawls 48 engage the clutch teeth 44 so as to bring about engagement of the clutch in the sequence of movements previously described.

We claim:
1. A power transmission arrangement comprising first and second shafts mounted substantially in line, means for automatically establishing or interrupting a driving connection between said shafts, according to the direction of relative rotation of the shafts, the said means comprising a first rotary clutch member carried by said first shaft, a secondary rotary clutch member carried by said second shaft, an intermediate member, means constraining said intermediate member for helical movement relative to said second clutch member, first clutch teeth on said first clutch member, second clutch teeth on said second clutch member, said first and second clutch teeth being spaced apart in the axial direction of the clutch, third clutch teeth on said intermediate member, said third clutch teeth being drivably engageable with said first clutch teeth by helical movement of said intermediate member in one direction relative to said second clutch member and disengageable therefrom by helical movement of said intermediate member in the other direction, fourth clutch teeth on said intermediate member, said fourth clutch teeth being drivably engageable with said second clutch teeth by helical movement of said intermediate member in said one direction relative to said second clutch member and disengageable therefrom by helical movement of said intermediate member in said other direction, first stop means for limiting said helical movement in said one direction, second stop means for limiting said helical movement in said other direction, said intermediate member being supported adjacent one end by the engagement of the tips of one set of said second and fourth clutch teeth with the roots of the inter-tooth spaces of the other set, coacting means on said second clutch member and said intermediate member for supporting and centering said intermediate member adjacent the other end thereof when said third and fourth clutch teeth are disengaged from said first and second clutch teeth, said coacting means being operative to support and center said intermediate mmeber when said third and fourth clutch teeth are drivably disengaged from said first and second clutch teeth, and being inoperative when said third and fourth clutch teeth are drivably engaged with said first and second clutch teeth, said intermediate member being supported at said other end, when said third and fourth clutch teeth are drivably engaged with said first and second teeth, by the interengagement of said third teeth with said first teeth.

2. A synchronous self-shifting clutch arrangement comprising first and second shafts mounted substantially in line, and means for automatically establishing or interrupting a driving connection between said shafts according to the direction of relative rotation of said shafts, said means comprising first clutch teeth carried by said first shaft, second clutch teeth carried by said second shaft, an intermediate member, means constraining said intermediate member for helical movement relative to said second shaft, first stop means for limiting said helical movement in one direction, second stop means for limiting said helical movement in the other direction, third clutch teeth carried by said intermediate member, fourth clutch teeth carried by said intermediate member and spaced axially from said third clutch teeth, said third clutch teeth and fourth clutch teeth being drivably engaged respectively with said first and second clutch teeth respectively when said intermediate member is in an engaged position against said first stop means and being disengaged from said first and second clutch teeth when said intermediate member is in a disengaged position against said second stop means, means for initiating engagement of said first and second clutch teeth with said third and fourth clutch teeth respectively upon relative angular movement of said first and second shafts in one direction, said intermediate member being supported by said second shaft at a first zone rotatable with said second clutch memmber, coacting means carried by said second shaft and said intermediate member for supporting and centering said intermediate member at a second zone rotatable with said second clutch member when said intermediate member is in said disengaged position, said intermediate member being supported, when in said engaged position, at a third zone, rotatable with said first shaft and spaced axially from said first zone, instead of at said second zone.

3. A power transmission arrangement comprising first and second shafts mounted substantially in line, a first ring of clutch teeth carried by said first shaft, a second ring of clutch teeth carried by said second shaft, said first and second rings of clutch teeth being spaced from one another in the axial direction of the clutch, an intermediate member, means constraining said intermediate member for helical movement relative to said second shaft, third and fourth rings of clutch teeth carried by said intermediate member, said third and fourth rings of clutch teeth being spaced from one another in the axial direction of the clutch whereby to drivably engage respectively with said first and second rings of clutch teeth upon helical movement of said intermediate member in one direction relative to said second shaft and to disengage therefrom upon helical movement of said intermediate member in the other direction relative to said second shaft, means for initiating the drivable engagement of said clutch teeth upon relative angular movement of said first and second shafts in one direction, two axially spaced supporting zones rotatable with said second shaft for supporting and centering said intermediate member when said first and second rings of clutch teeth are disengaged from said third and fourth rings of clutch teeth, and a further supporting zone rotatable with said first shaft, said further supporting zone being inoperative when said first and second rings of clutch teeth are disengaged from said third and fourth rings of clutch teeth and being disposed to take over the fuction of one of said two supporting zones rotatable with said second shaft when said intermediate member moves helically relative to said second shaft to drivably engage said first and second rings of clutch teeth respectively with said third and fourth rings of clutch teeth respectively.

References Cited by the Examiner
UNITED STATES PATENTS
2,972,397  2/61  Sinclair.

FOREIGN PATENTS
519,042  3/55  Italy.

DAVID J. WILLIAMOWSKY, *Primary Examiner.*
THOMAS J. HICKEY, *Examiner.*